United States Patent
Ham et al.

(10) Patent No.: US 12,545,505 B2
(45) Date of Patent: Feb. 10, 2026

(54) SERVICE VERIFICATION FOR A REAR LOADING REFUSE VEHICLE

(71) Applicant: The Heil Co., Chattanooga, TN (US)

(72) Inventors: Brian Huston Ham, Huntsville, AL (US); Kelly Lee Genzer, Magnolia, TX (US); Anthony Romano, Havertown, PA (US)

(73) Assignee: The Heil Co., Chattanooga, TN (US)

( * ) Notice: Subject to any disclaimer, the term of this patent is extended or adjusted under 35 U.S.C. 154(b) by 415 days.

(21) Appl. No.: 18/151,315

(22) Filed: Jan. 6, 2023

(65) Prior Publication Data
US 2023/0219749 A1 Jul. 13, 2023

Related U.S. Application Data

(60) Provisional application No. 63/297,370, filed on Jan. 7, 2022.

(51) Int. Cl.
*B65F 3/14* (2006.01)
*G01S 13/56* (2006.01)
*G01S 13/86* (2006.01)

(52) U.S. Cl.
CPC ............... *B65F 3/14* (2013.01); *G01S 13/56* (2013.01); *G01S 13/867* (2013.01); *B65F 2003/146* (2013.01)

(58) Field of Classification Search
CPC ...... G01S 13/867; G01S 13/56; G01S 13/931; B65F 2003/146; B65F 3/14; B65F 3/0213; B65F 2003/0223
See application file for complete search history.

(56) References Cited

U.S. PATENT DOCUMENTS

| | | | |
|---|---|---|---|
| 10,831,201 B2 * | 11/2020 | Spence | B65F 3/00 |
| 11,222,491 B2 | 1/2022 | Romano et al. | |
| 11,580,799 B2 | 2/2023 | Romano et al. | |
| 2019/0087790 A1 | 3/2019 | Flood | |
| 2019/0210798 A1 * | 7/2019 | Schultz | G01G 19/08 |
| 2019/0302259 A1 * | 10/2019 | Van Fleet | G01S 15/8997 |
| 2019/0325220 A1 | 10/2019 | Wildgrube et al. | |
| 2019/0385384 A1 | 12/2019 | Romano et al. | |
| 2020/0034785 A1 * | 1/2020 | Romano | G06Q 10/0832 |
| 2020/0247609 A1 * | 8/2020 | Maroney | B65F 3/04 |
| 2020/0348681 A1 * | 11/2020 | Clifton | G05D 1/689 |
| 2021/0326658 A1 * | 10/2021 | Swaroop | G06V 20/39 |
| 2022/0139126 A1 | 5/2022 | Romano et al. | |
| 2022/0161998 A1 * | 5/2022 | Turner | B65F 3/201 |

FOREIGN PATENT DOCUMENTS

JP     2023-510735 A     *    3/2023

* cited by examiner

*Primary Examiner* — Ladimir Magloire
*Assistant Examiner* — Kimberly Jenkins
(74) *Attorney, Agent, or Firm* — Fish & Richardson P.C.

(57) ABSTRACT

A service verification system for a rear loading refuse vehicle includes a motion sensor on a tailgate of the refuse vehicle. The motion sensor is configured to sense refuse being loaded into a tailgate hopper and to provide a time-stamped triggering signal corresponding to a refuse loading event. An onboard processor is configured to receive the triggering signal and evaluate other sensor data to correlate the refuse loading event with an entity.

26 Claims, 6 Drawing Sheets

SERVICE VERIFICATION FOR A REAR LOADING REFUSE VEHICLE

CROSS-REFERENCE TO RELATED APPLICATIONS

This application claims priority under 35 U.S.C. § 119(e) to U.S. Provisional Application No. 63/297,370, filed on Jan. 7, 2022, the contents of which are hereby incorporated by reference.

FIELD OF THE INVENTION

Disclosed embodiments relate generally to rear loading refuse collection vehicles and more particularly methods and systems for identifying and/or verifying a service event in a rear loading vehicle.

BACKGROUND INFORMATION

Refuse vehicles have long serviced homes and businesses in urban, residential, and rural areas. Collected waste is commonly transported to a landfill, an incinerator, a recycling plant, or some other facility. After collection in a hopper, the waste is generally compacted into a storage chamber in the body of the vehicle. Such compaction reduces the volume of the refuse and increases the carrying capacity of the vehicle.

Refuse vehicles commonly include an onboard computer system that assists the vehicle operator in completing the route. For example, some refuse vehicles may include an automated (or partially automated) service (or dump) verification system configured to verify service events and correlate the service events with individual customers. Such systems may be configured to sense actuation of front or side loading assemblies and thereby determine when refuse is loaded into the vehicle.

While service verification systems have been disclosed for front- and side-loader refuse vehicles, there is no known system for a rear loading vehicle and particularly for a manually loaded refuse vehicle. Service verification in manually loaded refuse vehicles presents a different (and particularly difficult) problem as there are no loading assemblies that can be instrumented. Moreover, a large number of manually loaded refuse vehicles remain in service, particularly in rural and tight urban locations. Therefore, a need remains in the industry for a service verification system rear loading vehicles (particularly manually loaded vehicles).

SUMMARY

A service verification system is disclosed for a rear loading refuse vehicle. The system includes a motion sensor deployed on a tailgate of the refuse vehicle. The motion sensor is configured to sense refuse being loaded into a tailgate hopper and to provide a time-stamped triggering signal corresponding to a refuse loading event. An onboard processor is configured to receive the triggering signal and evaluate other sensor data to correlate the refuse loading event with an entity.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

A rear loading refuse vehicle is disclosed. The vehicle includes a tailgate deployed on a rear end of a vehicle body. The tailgate includes a hopper configured to receive refuse and is configured to move between a closed position and an open position. A refuse packing assembly is deployed in the tailgate and is configured to compact refuse received in the hopper into the vehicle body. A motion sensor on the tailgate is configured to sense refuse being loaded into the hopper and to provide a time-stamped triggering signal corresponding to such a refuse loading event. An onboard processor is configured to receive the triggering signal and evaluate other sensor data to correlate the refuse loading event with an entity such as a customer.

The vehicle may optionally further include a global positioning sensor and at least one onboard video camera situated to record the refuse loading event (e.g., pointing towards the hopper or other rear portions of the vehicle). The sensor may be advantageously configured to sense refuse being manually loaded into the hopper.

The sensor may optionally include an active motion sensor such as a programmable radar sensor having a programmable sensory zone. The motion sensor may optionally include a wide angle sensory zone having a sensory angle greater than about 60 degrees in azimuth and in elevation and an operating at frequency range from about 77 GHz to about 81 GHz.

The motion sensor may be configured to provide the time-stamped triggering signal corresponding to the refuse loading event in response to a direction of sensed motion (e.g., the sensed direction of motion of a trash back thrown into the hopper). The motion sensor may also be configured to ignore motion of the refuse packing assembly.

The onboard processor may be configured to determine global coordinates (based on GPS measurements) of pre-loaded refuse corresponding to the refuse loading event and to correlate the coordinates with the entity.

The disclosed embodiments may advantageously provide an automatic load verification system for a rear loading refuse vehicle and/or a manually loaded refuse vehicle. The disclosed embodiments are advantageously configured to sense manually loaded refuse (e.g., via a programmable radar sensor) and to provide the service verification based on global positioning and/or other sensor data. The system advantageously provides a high degree of accuracy with relatively few missed service events (false negatives) and relatively few false positives. Moreover, the disclosed embodiments may be configured for substantially any route upon which manual loading refuse vehicles are employed, for example, including rural, suburban, and urban routes. The disclosed embodiments may even provide accurate verification when the vehicle is being loaded from either or both sides (e.g., on one way streets or alleys).

Figure 1:
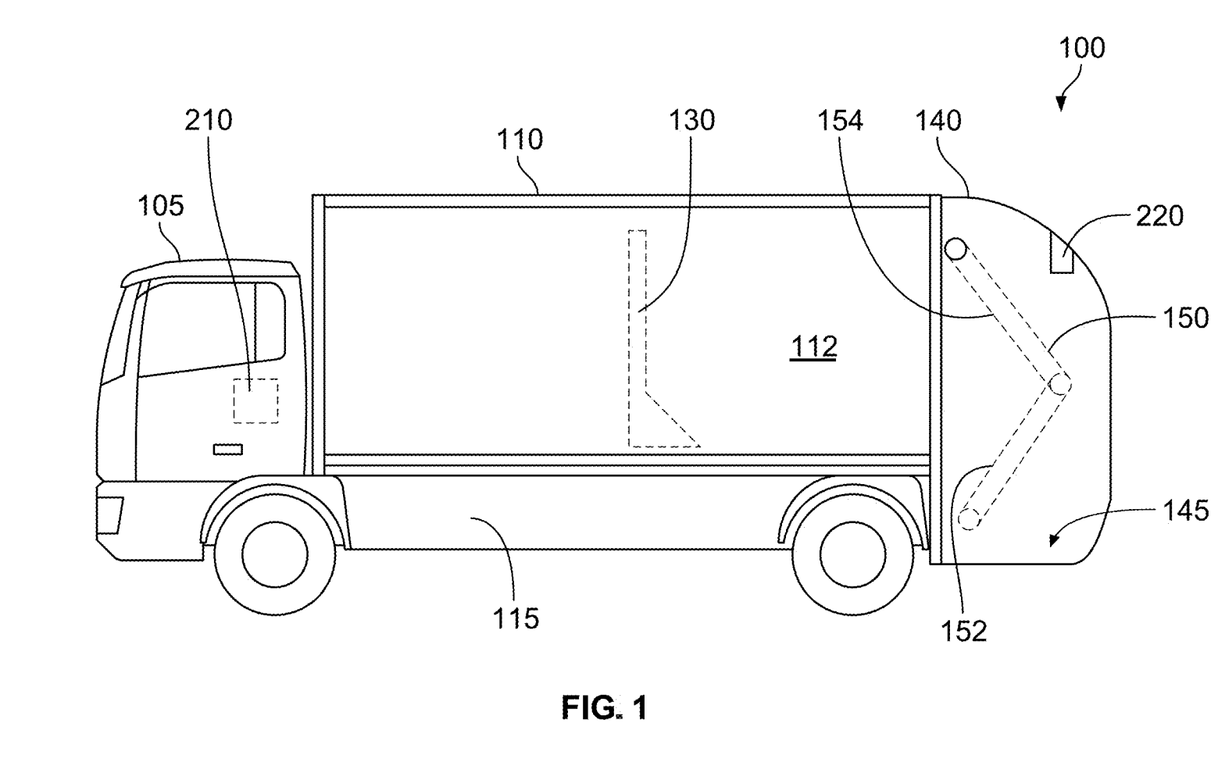
FIG. 1 depicts a side view of one disclosed embodiment of a rear loading refuse vehicle.

FIG. 1 depicts a side view of an example rear loading refuse vehicle 100 employing one embodiment of a service verification system including a processing unit 210 (e.g., an onboard computer system including a service verification module) and a sensor 220 (both of which are described in more detail below with respect to FIGS. 2 and 3). The depicted vehicle 100 includes a vehicle body 110 and a cab 105 deployed on a chassis (or frame) 115. The vehicle body 110 includes (or houses) a refuse storage chamber 112 configured to receive and store compacted refuse for transfer. A rear loading tailgate 140 is deployed on a rearward facing end of the body 110 and is configured to open and close the refuse storage chamber 112 to the outside world. The tailgate 140 generally includes an open back and a hopper 145 on a lower end thereof. The hopper 145 is configured to receive refuse, for example, via manually loading conventional bags or refuse containers (not shown).

Rear loading refuse vehicle 100 may further include a refuse packing assembly 150 deployed in the tailgate 140. The assembly may include a blade 152 rotationally coupled to a slide panel 154. A plurality of actuators (e.g., hydraulic pistons) may be deployed and configured to rotate the blade 152 and slide 154 with respect to one another and to rotate and translate the blade 152 and slide 154 with respect to the tailgate 140. Such actuation of the assembly 150 is intended to remove refuse from the hopper 145 and compact the refuse in the storage container 112 against an ejector panel 130. The ejector panel 130 may be configured to retract towards the front of the vehicle body as the storage container 112 fills with compacted refuse. When the vehicle is full, the tailgate may be opened and the refuse ejected via extending the ejector panel 130 to the rear of the body 110. The above described refuse packing assembly 150 and ejector panel 130 configurations are well known and widely used in the industry. However, it will be understood that the disclosed embodiments are not limited in regards to any particular ejector and/or refuse packing assembly configuration.

While not depicted on FIG. 1, it will be understood that the tailgate 140 may be rotationally coupled to the vehicle body 110 such that it rotates with or about a hinge or pin between open and closed positions. For example, the tailgate 140 may be rotationally fixed to a shaft via tailgate brackets (not shown). The tailgate brackets may be welded and/or bolted to both the tailgate 140 and the shaft (which is in turn configured to rotate with respect to the body). The disclosed embodiments are, of course, not limited to any particular tailgate open and close mechanism.

Tailgate 140 may be opened and closed using substantially any suitable mechanism. For example, while not depicted on FIG. 1, hydraulic actuators (such as pistons) are commonly employed to open and close the tailgate 140. The hydraulic actuators may be deployed, for example, on opposing sides of the body 100 and/or tailgate 140. In alternative embodiments, the tailgate 140 may be opened and closed via electrical actuation (e.g., via an electrically powered winch deployed on the roof of the body 110). It will be understood that the disclosed embodiments are not limited to any particular tailgate actuation mechanism.

It will be further understood that in the disclosed embodiments, the vehicle 100 may optionally include a tailgate locking mechanism (not shown) to lock the tailgate 140 in the closed position. The locking mechanism may be advantageously configured to secure the tailgate 140 in the closed position such that it can withstand refuse compaction forces imparted by the packing assembly 150 against the ejector panel 130. An optional locking mechanism may include substantially any suitable mechanism known to those of ordinary skill in the art.

Figure 2A:
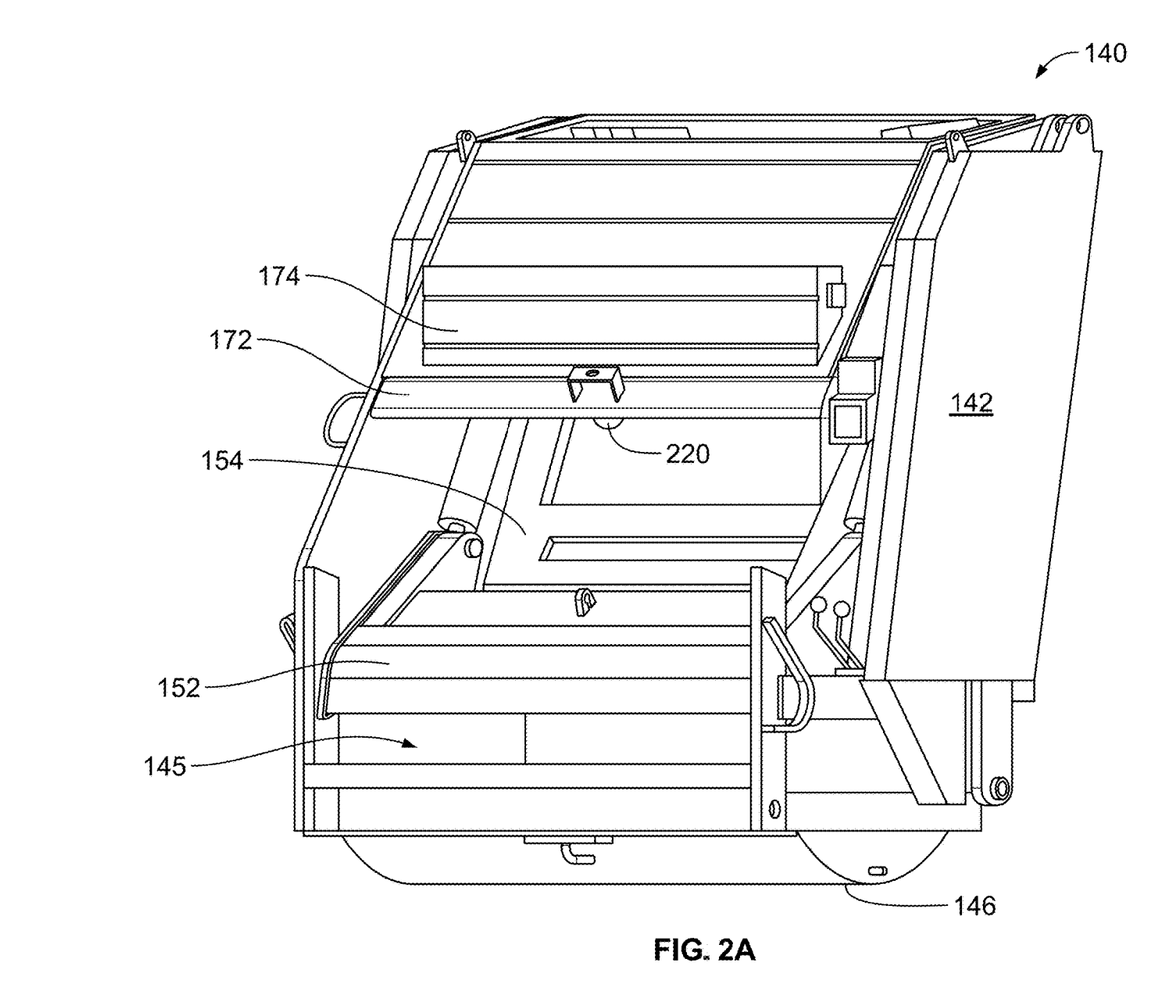
FIGS. 2A and 2B (collectively FIG. 2) depict a perspective view of the tailgate shown on FIG. 1.
Figure 2B:
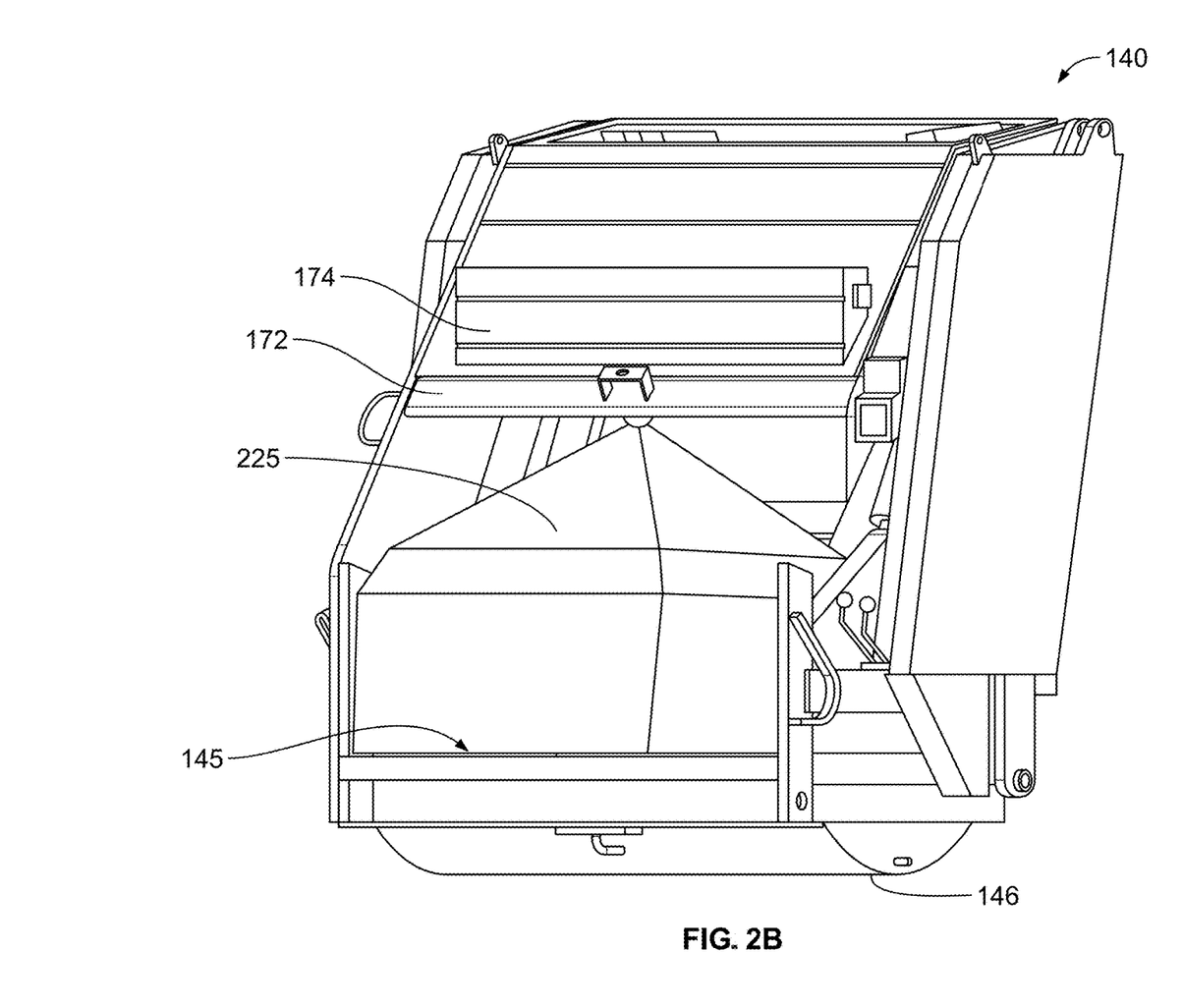

FIGS. 2A and 2B (collectively FIG. 2) depict a perspective view of one example of the tailgate 140 shown on FIG. 1. As described above with respect to FIG. 1, tailgate 140 includes a hopper 145 and a refuse packing assembly 150 including a blade 152 and slide panel 154 configured to remove refuse from the hopper (and hopper floor 146) and compact the refuse in the vehicle body 110. In the depicted embodiment, the tailgate further includes a sensor 220 configured to sense refuse being loaded into the hopper (such loading is referred to herein as a service event or a loading event and verification of such loading is referred to as a service verification). For example, the sensor 220 may be configured to sense bags or other refuse being thrown into the hopper 145 from the rear or side of the tailgate 140. The sensor may also be configured to sense refuse being dumped into the hopper 145 (e.g., via manually dumping a can of refuse into the hopper).

In the depicted embodiment, the sensor 220 is deployed on the underside of a cross member 172 (sometimes referred as a bolster) above hopper 145. The sensor 220 may be (although is not necessarily) deployed centrally on the cross member 172 (e.g., equidistant between the sides 142 of the tailgate 140). The disclosed embodiments are not limited in this regard as the sensor 220 may be deployed substantially anywhere on the cross member or in/on the light box 174 located above the cross member 172. While the exact location of the sensor 220 is not critical, it is generally desirable for the sensor to be so located that it can readily sense refuse loading anywhere in the hopper 145.

The sensor 220 may include substantially any sensor suitable for sensing/detecting refuse being loaded into the hopper 145. In certain embodiments, the sensor 220 may include an active motion sensor. By active it is meant that the sensor 220 transmits energy outward therefrom (e.g., outward from the sensor body) and receives reflected energy from a sensed object. The transmitted energy may include, for example, ultrasonic energy, microwave radiation, or radio waves. In embodiments utilizing an active motion sensor, the active motion sensor may be configured to sense the motion of refuse objects (e.g., bags of refuse) as they are loaded (e.g., thrown) into the hopper.

In one advantageous embodiment, the sensor 220 may include a tomographic sensor that transmits and receives radio waves. Such a sensor may also be referred to as a radar sensor. A radar sensor may be configured to transmit radio waves and to receive reflected radio waves from one or more nearby objects (e.g., from refuse being loaded into the hopper). In certain advantageous embodiments such a radar sensor may be programmable and able to track multiple objects simultaneously. For example, an advantageous radar sensor may be capable of tracking both a position and a velocity of each of one or more objects. An advantageous radar sensor may be sensitive to objects in one or more sensory zones. The sensory zone(s) of the sensor may advantageously be a wide angle sensory zone, for example, having a sensory angle greater than about 60 degrees in azimuth and in elevation. Moreover, an advantageous radar sensor may be configured to operate at a high frequency, for example, in frequency range from about 77 GHz to about 81 GHz. The use of a high frequency sensor may advantageously provide improved spatial and temporal resolution for tracking the sensed objects.

FIG. 2B further schematically depicts an example sensory zone 225 for a suitable sensor configuration (e.., a radar sensor configuration). In the depicted embodiment, the sensor 220 is pointing downwards from the bolster 172 into the hopper 145. The sensory zone 225 angles outward from the sensor 220 and substantially fills the hopper 145 (in other words most or all of the hopper volume and most of the volume above the hopper is within the sensory zone 225). In the depicted embodiment, the sensory zone 225 further extends rearward behind the vehicle body such that the sensor may detect refuse before it arrives in the hopper (e.g., a thrown bag may be sensed and tracked as it approaches the hopper).

Figure 3:
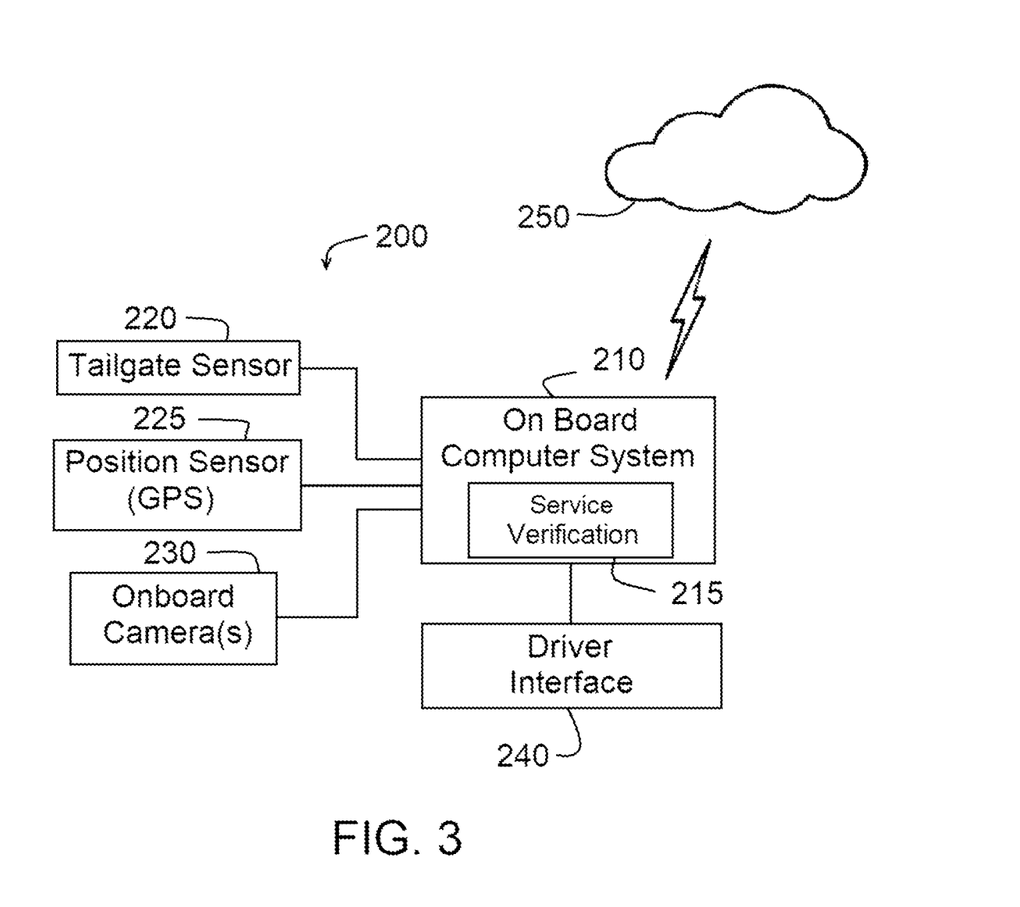
FIG. 3 depicts a block diagram of one embodiment of a service verification system deployed in refuse vehicle depicted on FIG. 1

FIG. 3 depicts a block diagram of one embodiment of an onboard service verification system 200 deployed in the refuse vehicle depicted on FIG. 1. System 200 may be utilized in (or incorporated into) substantially any rear loading refuse vehicle, for example, the manually loaded refuse vehicle 100 depicted on FIG. 1. In the depicted embodiment, an onboard computer system 210, including a load verification module 215, is in communication with tailgate sensor 220 (described above with respect to FIGS. 1 and 2). The computer system 210 (and load verification module 215) may optionally be in further communication with a vehicle position sensor 225 (such as global positioning chipset) and one or more onboard cameras 230 as well as with the cloud 250 (e.g., via a cellular or other online network).

The onboard computer system 210 may include substantially any suitable computing system, for example, including one or more processors and electronic memory. Onboard computing systems are known in the industry and commonly include one or more of the following: a CPU, a memory or data storage unit, a CAN interface, a CAN chipset, NIC(s) such as an Ethernet port, USB port, serial port, I2c lines(s), and so forth, I/O ports, a wireless chipset, a GPS chipset with or without dead reckoning, a real-time clock, a micro SD card, an audio-video encoder and decoder chipset, and/or external wiring for CAN and for I/O. It will be understood that the disclosed embodiments are not limited to any particular computer system, however, the computer system 210 is generally capable of hosting/implementing the service verification module.

The service verification system 200 may further include (or make use of) substantially any suitable position sensor such as a sensor that communicates with the satellite-based global positioning system (GPS). The position sensor 225 may be deployed within the computer system 210 or elsewhere on the vehicle (the disclosed embodiments are not limited in this regard). The vehicle may further optionally include one or more cameras 230 (e.g., video cameras) configured to communicate with the computer system 210 to generate and store image or video data pertaining to a route. As is known to those of ordinary skill in the art, the cameras 230 may be positioned at various locations on the vehicle (e.g., viewing the operator, the rear of the vehicle, the sides of the vehicle, the back of the vehicle, and the hopper). It will be understood that the disclosed embodiments do not require the use of cameras, however, may be enhanced with image and/or video data. Suitable cameras 230 may also be equipped to record and transmit audio data to the onboard computer system 210.

While not depicted on FIG. 3, it will be understood that the vehicle 100 may (and often does) include numerous other sensors. For example, the vehicle may further include temperature sensors, battery and ignition voltage sensors, additional motion sensors, accelerometers, a gyroscope, and an altimeter to name a few of such optional additional sensors. Any portion of the sensor data (including the video data) may be made available to the vehicle operator via the driver interface 240.

Note that the term module as used herein in referring to the service verification module 215 may simply refer to a computer software routine configured to perform a particular task or particular tasks (e.g., related to the service verification methodology). The routine may run, for example, on the onboard computer 210. The module may likewise refer to a platform including a combination of dedicated hardware and software configured to perform the load verification methodology. Such hardware may include one or more processors, dedicated memory, and a database including various details of the route such the pickup locations. Such hardware may be in communication with or incorporated into the onboard computer 210.

With continued reference to FIG. 3, the vehicle computer system 210 may configured to be in two-way communication (e.g., via a cellular carrier) with other internet based computing systems 250 (the cloud). For example, load verification events and corresponding supporting data may be uploaded in real time to the cloud 250, (e.g., to an online database) where it may be further evaluated and/or made available to support staff or the general public (including customers). The computer system 210 may also be in communication with a driver interface 240, although, it will be understood that the disclosed load verification system 200 is intended to be fully automatic and not require driver interaction.

Figure 4:
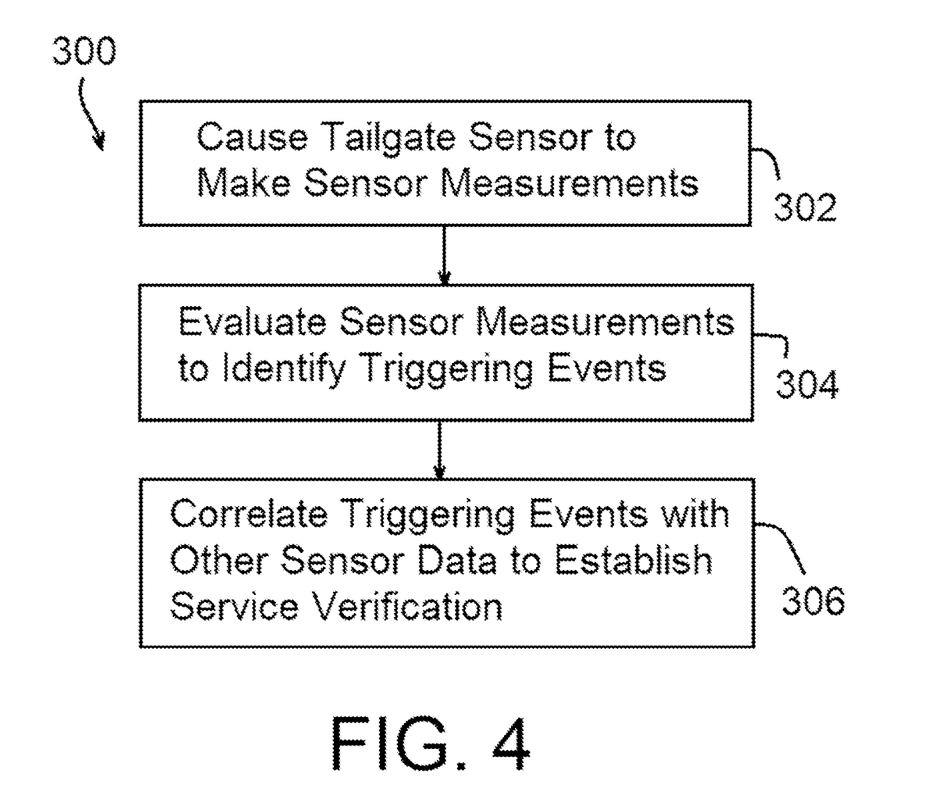
FIG. 4 depicts one example method for providing service verification using the system depicted on FIG. 3.

FIG. 4 depicts one example service verification process 300 executed by service verification module 215 (FIG. 3). The tailgate sensor 220 is used to make sensor measurements at 302. The sensor data is evaluated at 304 (e.g., via the sensor electronics or via the service verification module) to identify a triggering event. For example, a triggering event may be recorded when one or more objects are sensed in or moving in the sensory zone 225 as described in more detail below. In certain embodiments a time-stamped triggering signal may be provided (transmitted) by the sensor and received by the onboard computer system. The received signal may then be evaluated with other sensor data at 306 (e.g., global positioning data and/or camera data) to correlate the service event with a particular customer (and thereby establish and support a service verification event at a particular customer site along the route).

Figure 5:
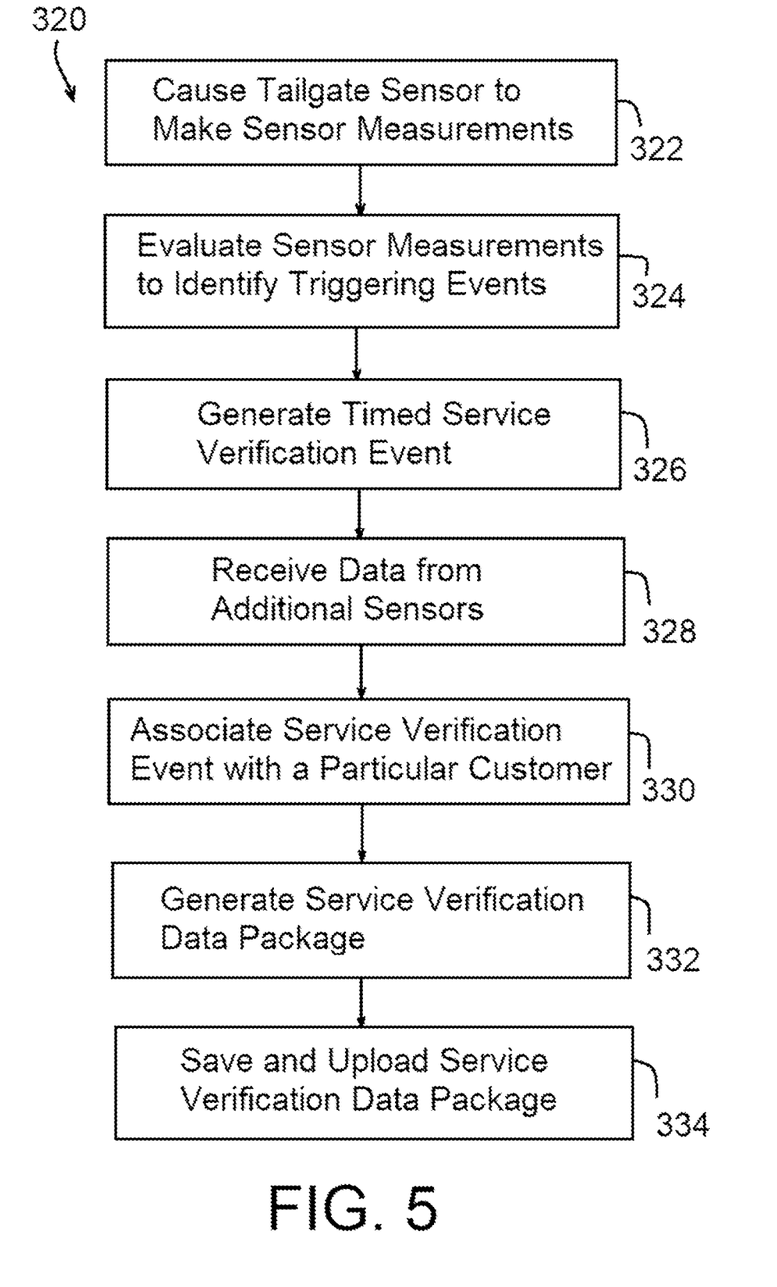
FIG. 5 depicts a more detailed method for providing service verification using the system depicted on FIG. 3.

FIG. 5 depicts a more detailed service verification process 320 executed by service verification module 215 (FIG. 3). Sensor data is received (obtained) by the tailgate sensor 220 at 322 while collecting refuse in route. As described above with respect to FIG. 2, in certain advantageous embodiments the sensor 220 may include a programmable radar sensor. In such embodiments, the radar sensor may be configured (e.g., programmed) to detect objects in or moving in one or more predetermined sensory zones. At 324 the radar sensor sends a signal to a digital switch thereby closing the switch and providing a triggering event (or signal) to service verification module 215 when an object is appropriately sensed in one of the sensory zones (as described in more detail below).

With continued reference to FIG. 5, the service verification module 215 creates a timed service verification event at 326 upon receiving the triggering signal at 324. Additional sensor data is received at 328 (e.g., including global positioning data and/or camera image/video data) and evaluates the additional sensor data in combination with the timed service verification event at 330 to associate the service verification event with a particular customer. For example, global positioning sensor data may be compared with a customer database including global positioning coordinates. A service verification data package is generated at 332 and stored to memory and/or uploaded to the cloud 250 (FIG. 3) at 334. The service verification package may include substantially any data related to the triggering event, for example, including a timestamp, global coordinates, and photo and/or video data supporting the event).

With continued reference to FIGS. 4 and 5, upon detecting the triggering condition (e.g., one or more objects moving in the sensory zone), the sensor 220 may transmit a signal (or signals) to the service verification module 215 (e.g., via closing a switch as described above). The signal may be transmitted via substantially any suitable hardwired or wireless network. The signal may include, for example, the time of the event and the location and motion of the sensed object(s) within the sensory zone of the sensor. The signal may optionally further include at least a portion of the sensor data for further evaluation by the service verification module.

The use of a programmable radar sensor may advantageously enable highly accurate service verification. For example, a programmable sensor may reduce both false negatives (a false negative may be defined as a missed service event) and false positives (a false positive may be defined as recording a triggering event when no refuse has been loaded). In particular, the sensor may be programmed to ignore certain objects or predetermined types of motion within the sensory zone. In one embodiment, motion of the blade 152 or slide panel 154 may be ignored. For example, the sensory zone 225 may be configured (sized and shaped) such that the sensor is not responsive to the blade 152 or slide panel 154. Moreover, the locations and velocities (direction of motion and speed) of the blade 152 and slide panel 154 are known during a compaction event (in which the assembly 150 first reaches down and back into the hopper 145 and then pulls the loaded refuse up and forward into the vehicle body 110). The sensor may therefore be programmed to ignore objects with identical locations and motions (or similar motions within a predetermined threshold). Still further, a triggering event may be defined to require motion of the refuse in a certain direction (e.g., towards the sensor or having a directional component directed towards the front of the vehicle).

Yet further processing may be implemented to reduce or eliminate false positives. For example, the sensor data may be processed in combination with the speed of the vehicle with triggering events being excluded when the vehicle speed exceeds a threshold (e.g., 5, 10, or 15 miles per hour). The vehicle may be further equipped with an additional sensor configured to determine when a compaction routine has been initiated.

As described above, the service verification event may be processed in combination with various additional sensor data to associate the service verification with a particular customer. For example, geographic coordinates of the refuse vehicle may be obtained from the position sensor corresponding to the time of the triggering event (at a time when an object is sensed by the sensor as described above). For example position sensor 225 may be configured to receive signals from the global positioning system (GPS) and determine the location (e.g., latitude and longitude) of the positioning sensor based on the received signals. The sensor coordinates may then be further processed to determine the coordinates of the refuse prior to being manually loaded into the vehicle (e.g., based on the configuration of the vehicle and a calculated location of the operator who loaded the refuse). For example, a known positional difference between a rear corner of the vehicle and the position sensor 225 may be combined with the measured coordinates and a heading of the vehicle to determine coordinates of the pre-loaded refuse.

The coordinates of the pre-loaded refuse may then be correlated with land parcel data describing the geographic coordinates, boundaries, and/or shapes of the various parcels in the area (e.g., the city) where the vehicle is operating. The parcel data may be publicly available data that describe the parcels as the divisions of the land, in a city, county, or other area, for tracking land ownership or other purposes. The parcel data may further identify entities (e.g., individuals or companies) that own or otherwise occupy the parcel(s). By finding the particular parcel that is closest to the coordinates of the refuse being loaded, and by determine the entity associated with the closest particular parcel (e.g., the entity owning or leasing the parcel), the service verification may be associated with the parcel and therefore the entity associated with the parcel.

The disclosed embodiments are, of course, not limited to the use of the above described parcel data. The coordinates of the pre-loaded refuse may also be correlated with a refuse position database including a listing of customers and corresponding positional coordinates of refuse pickup locations. These positional coordinates may include, for example, the position at which the refuse is generally collected. It will be appreciated, that customers commonly position their refuse at the same (or a similar) location at each service interval. This location may be stored in a database independent of the above described parcel records. In such embodiments, the service verification may be directly associated with the corresponding customer (entity) in the database.

It will be appreciated that it may be beneficial to further process the tailgate sensor data to determine the coordinates of the pre-loaded refuse. For example, it may be necessary in certain routes (such as alley routes in urban areas or routes in which refuse is located on both sides of a one-way street) to determine whether the refuse was loaded from the right rear corner or left rear corner of the vehicle. This information may be obtained, for example, by further programming the sensor 220 to indicate which of the sensory zones (e.g., right or left side of the hopper 245) first sensed the loaded refuse. The sensor 220 may be further programmed to compute the direction of flight (motion) of the loaded refuse and thereby provide further confirmation of the loading side. It will be appreciated that refuse loaded from the right side of the vehicle would commonly have a lateral velocity component from right to left. Likewise, refuse loaded from the left side of the vehicle would commonly have a lateral velocity component from right to left. Photo or video images obtained from the onboard camera(s) 230 may be further processed to determine whether the refuse was loaded from the left or right side of the vehicle.

The above described service verification may advantageously be implemented automatically (i.e., without explicit human input or activity). Such service verification is intended automatically detect refuse loading events and automatically identify the customer corresponding to each event without any driver interaction. In some implementations, the generated verification may be automatically communicated directly to the customer (e.g., via email or text messaging). In certain implementations the verification may be further used for billing purposes, such as customer invoicing.

Although service verification for a rear loading refuse vehicle has been described in detail, it should be understood that various changes, substitutions and alternations can be made herein without departing from the spirit and scope of the disclosure as defined by the appended claims.

The invention claimed is:

1. A rear loading refuse vehicle comprising:
a tailgate on a rear end of a vehicle body, the tailgate configured to move between a closed position and an open position, the tailgate including a hopper configured to receive refuse;
a refuse packing assembly in the tailgate configured to compact refuse received in the hopper into the vehicle body;
a motion sensor on the tailgate, the motion sensor configured to:
monitor a sensory zone comprising at least part of a volume of the hopper;
detect motion in the sensory zone corresponding to at least one object entering the hopper; and
provide a time-stamped triggering signal corresponding to the detected motion; and
an onboard processor configured to:
receive the triggering signal;
determine that the triggering signal represents a refuse loading event; and
evaluate other sensor data to correlate the refuse loading event with an entity.

2. The refuse vehicle of claim 1, further comprising at least one onboard video camera situated to record the refuse loading event, wherein evaluating the other sensor data comprises evaluating video data generated by the at least one onboard video camera.

3. The refuse vehicle of claim 1, wherein the motion sensor comprises an active motion sensor operating at frequency range from about 77 GHz to about 81 GHz.

4. The refuse vehicle of claim 1, wherein the motion sensor comprises a programmable radar sensor, and the sensory zone comprises a programmable sensory zone defined by a user.

5. The refuse vehicle of claim 1, wherein the motion sensor comprises a wide angle motion sensor comprising a sensory angle greater than about 60 degrees in azimuth and in elevation.

6. The refuse vehicle of claim 1, wherein determining that the triggering signal represents the refuse loading event is based at least in part on a direction of the motion of the at least one object detected by the motion sensor.

7. The refuse vehicle of claim 1, wherein the motion sensor is configured to ignore motion of the refuse packing assembly by excluding the refuse packing assembly from the sensory zone.

8. The refuse vehicle of claim 1, wherein the other sensor data comprises global positioning sensor data.

9. The refuse vehicle of claim 8, wherein evaluating the other sensor data to correlate the refuse loading event with the entity comprises:
determining global coordinates of the at least one object prior to the at least one object entering the hopper using the global positioning sensor data; and
correlating the global coordinates with the entity.

10. The refuse vehicle of claim 1, wherein the onboard processor is configured to (i) generate a timed service verification event corresponding to the refuse loading event, (ii) receive the other sensor data, and (iii) associate the timed service verification event with the entity.

11. The refuse vehicle of claim 10, wherein the onboard processor is further configured to (iv) generate a service verification data package and (v) at least one of save the data package to memory or upload the data package to a cloud server.

12. The refuse vehicle of claim 11, wherein the data package comprises at least a time-stamp, global coordinates, identifying information for the entity, and image or video data.

13. The refuse vehicle of claim 1, wherein determining that the triggering signal represents the refuse loading event comprises determining that the motion of the at least one object detected by the motion sensor has a directional component towards a front of the refuse vehicle.

14. The refuse vehicle of claim 1, wherein determining that the triggering signal represents the refuse loading event comprises determining that the motion of the at least one object differs from motion of the refuse packing assembly by at least a threshold difference.

15. A service verification system for a rear loading refuse vehicle, the system comprising:
a motion sensor on a tailgate of the refuse vehicle, the motion sensor configured to:
monitor a sensory zone comprising at least part of a volume of a hopper in the tailgate;
detect motion in the sensory zone corresponding to at least one object entering the hopper; and
provide a time-stamped triggering signal corresponding to the detected motion; and
a processor configured to:
receive the triggering signal;
determine that the triggering signal represents a refuse loading event; and
evaluate other sensor data to correlate the refuse loading event with an entity.

16. The service verification system of claim 15, further comprising at least one onboard video camera situated to record the refuse loading event, wherein evaluating the other sensor data comprises evaluating video data generated by the at least one onboard video camera.

17. The service verification system of claim 15, wherein the motion sensor comprises an active motion sensor operating at frequency range from about 77 GHz to about 81 GHz.

18. The service verification system of claim 15, wherein the motion sensor comprises a programmable radar sensor, and the sensory zone comprises a programmable sensory zone.

19. The service verification system of claim 15, wherein the motion sensor comprises a wide angle motion sensor comprising a sensory angle greater than about 60 degrees in azimuth and in elevation.

20. The service verification system of claim 15, wherein determining that the triggering signal represents the refuse loading event is based at least in part on a direction of the motion of the at least one object detected by the motion sensor.

21. The service verification system of claim 15, wherein the motion sensor is configured to ignore motion of a refuse packing assembly of the refuse vehicle by excluding the refuse packing assembly from the sensory zone.

22. The service verification system claim 15, wherein the other sensor data comprises global positioning sensor data.

23. The service verification system of claim 22, wherein evaluating the other sensor data to correlate the refuse loading event with the entity comprises:
- determining global coordinates of the at least one object prior to the at least one object entering the hopper using the global positioning sensor data; and
- correlating the global coordinates with the entity.

24. The service verification system claim 15, wherein the processor is configured to (i) generate a timed service verification event corresponding to the refuse loading event, (ii) receive the other sensor data, and (iii) associate the timed service verification event with the entity.

25. The service verification system of claim 24, wherein the processor is further configured to (iv) generate a service verification data package and (v) at least one of save the data package to memory or upload the data package to a cloud server.

26. The service verification system of claim 25, wherein the data package comprises at least a time-stamp, global coordinates, identifying information for the entity, and image or video data.

\* \* \* \* \*